April 9, 1963  F. A. DAHMS  3,085,160
GLASSWARE INSPECTION APPARATUS
Filed April 25, 1960  2 Sheets-Sheet 2
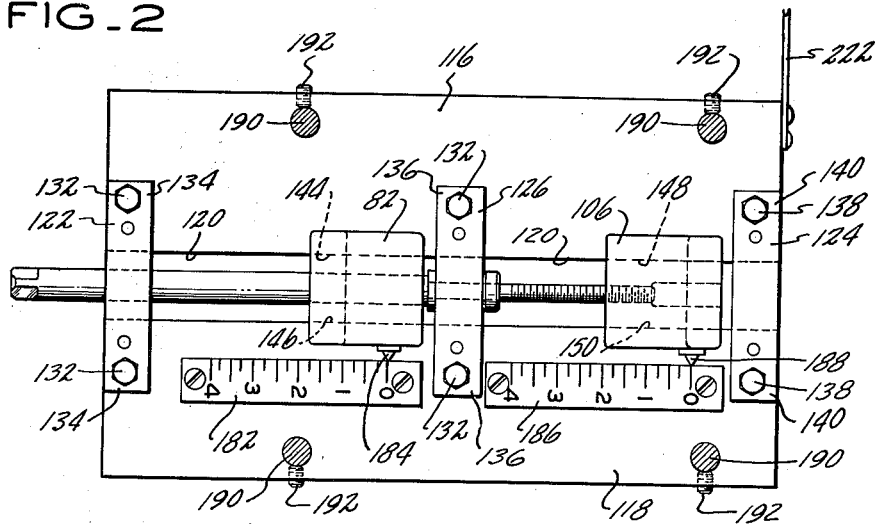
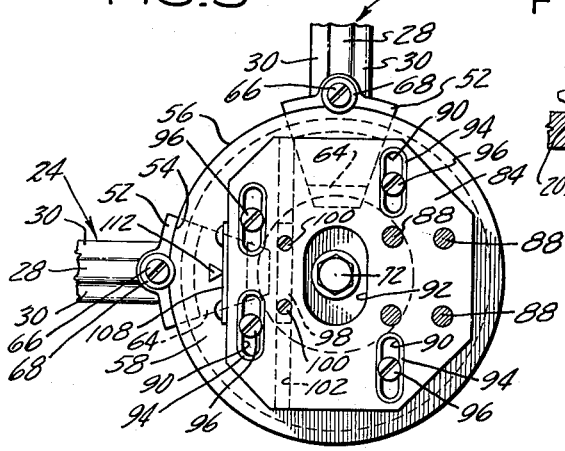
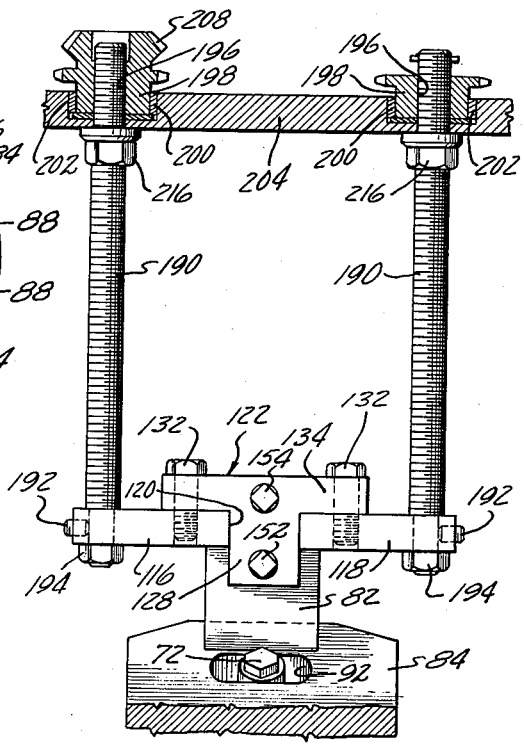
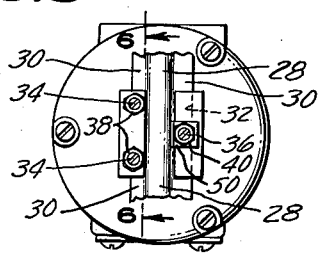
INVENTOR
FRANCIS A. DAHMS
BY Teller & McCormick
ATTORNEYS

United States Patent Office 3,085,160
Patented Apr. 9, 1963

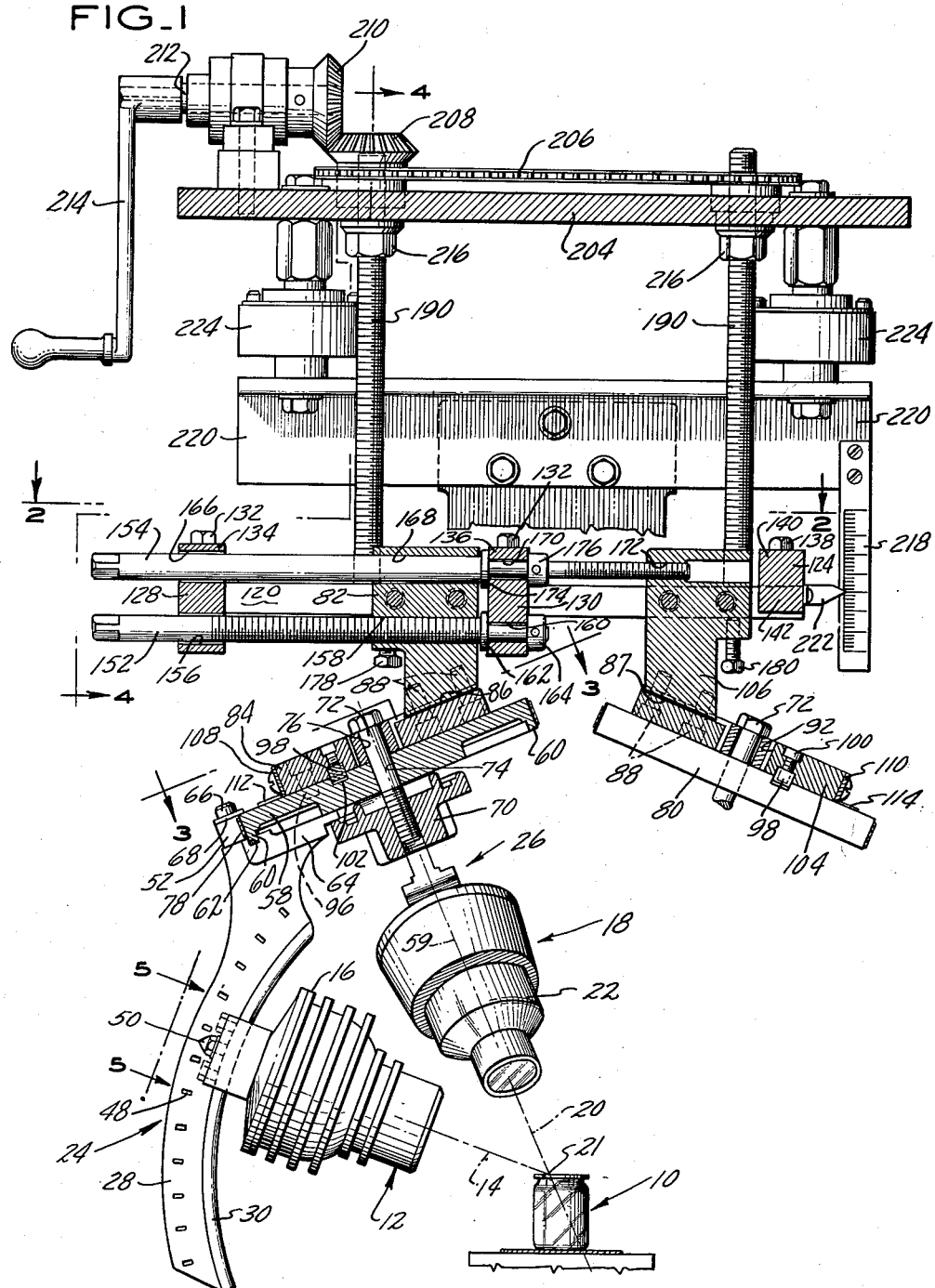

3,085,160
GLASSWARE INSPECTION APPARATUS
Francis A. Dahms, Tariffville, Conn., assignor to Emhart Manufacturing Company, Hartford, Conn., a corporation of Delaware
Filed Apr. 25, 1960, Ser. No. 24,567
9 Claims. (Cl. 250—234)

This invention relates to apparatus for inspecting glassware for checks or other defects and, more particularly, to improved means for mounting optical inspection apparatus comprising one or more light source units adapted to direct a beam of light on an article of glassware and one or more light sensitive receiving units adapted to receive rays of light reflected from checks or other defects in the illuminated portion of the article of glassware.

It is the general object of the invention to provide improved mounting means for at least one light source unit and at least one light sensitive receiving unit, the said means being particularly adapted to accommodate certain adjustments of the positions of said units whereby angles at which a beam of light strike an article of glassware and angles at which reflected rays are picked up from the article may be adjusted or changed more conveniently than has heretofore been possible.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a vertical transverse section through the improved mounting means of the present invention;

FIG. 2 is a horizontal section through the mounting means taken generally as indicated by the line 2—2 in FIG. 1;

FIG. 3 is a fragmentary sectional view taken generally as indicated by the line 3—3 in FIG. 1;

FIG. 4 is a vertical longitudinal section taken generally as indicated by the line 4—4 in FIG. 1;

FIG. 5 is an enlarged fragmentary view taken generally as indicated by the line 5—5 in FIG. 1 and showing a portion of a light source unit on the mounting means of the invention; and FIG. 6 is a sectional view taken generally as indicated by the line 6—6 in FIG. 5.

In the inspection of articles of glassware for checks or other defects, it is a conventional practice to transport the articles to an inspection station where a beam of light is directed thereon and where a light sensitive receiving unit is arranged to receive light rays reflected from checks or other defects in the illuminated portion of the article. The light sensitive receiving unit is usually operatively connected with a reject apparatus which operates to divert defective articles of glassware as they are transported away from the inspection station.

Various types of optical inspection systems or apparatus are utilized to direct a beam of light on articles of glassware and to pick up light reflected therefrom in glassware inspection machines operating in accordance with the method set out above. However, focused optical systems provide substantial advantages in breadth and accuracy of detection of checks and other defects and such systems are generally considered superior to other types of systems. In a focused optical system, one or more lenses is provided to collect and focus light rays emitted from a light source on a selected inspection area on an article of glassware. Similarly, the light sensitive receiving unit of the system has one or more lenses which collect and focus light rays reflected from defects on a light sensitive element in the unit or on a shield or the like associated with the said element.

From the foregoing, it will be apparent that adjustable mounting of light source and light sensitive receiving units is desirable in glassware inspection machines. Checks and other defects in glassware cannot be expected to be uniform in size, shape or general character. Small surfaces in the checks or other defects which reflect light to the light sensitive receiving unit or units of the optical system or apparatus may be expected to be randomly oriented. Thus, in order to provide for detection of a maximum number of checks or other defects in a given series or "run" of glass articles, it may be desirable to change the angle at which the beam of light is directed on the articles and also to change the position of the receiving unit whereby to change the angle of pickup of reflected light ways. Further, it may be desirable to change these "inspection angles" without changing the "inspection distances," i.e., the distance between the light source and the illuminated or inspection area on the article of glassware and the distance between said area and the light sensitive element in the receiving unit. In the case of a focused optical system of the type mentioned above, it will be obvious that it is particularly important that the "inspection distances" remain constant. Changes in these distances will cause the optical system or apparatus to be out of focus and will seriously impair its effectiveness.

The advantages of the improved mounting means of the present invention are particularly well illustrated when said means is utilized with a focused optical system and the mounting means is so shown and described, but it is to be understood that the invention is not to be construed as so limited. As will be seen, the mounting means of the invention comprises a support means for holding at least one light source unit and at least one light sensitive receiving unit in operative positions with respect to an article of glassware. The said support means is adapted to accommodate adjustment of the position of at least one of said units, and preferably both of the units, along the surface of a hypothetical sphere having its center in the illuminated or inspection area on the article of glassware. This obviously permits "inspection angles" to be changed or adjusted conveniently without changing "inspection distances" and impairment of the effectiveness of the optical system due to out-of-focus conditions is avoided.

In addition to the above-mentioned adjustments of the positions of the units of the optical system or apparatus, the mounting means of the invention provides additional adjustments for changing the positions of said units to accommodate articles of glassware of varying size and shape. That is, the aforesaid support means is carried by a means which permits multidirectional adjustments of said support means and the optical system units mounted thereon whereby said support means and said units can be moved in unison as required to accommodate different sizes and shapes of glass articles. For ease in effecting the desired adjustments and particularly to facilitate repeat setup operations, scale means are provided for indicating the extent or degree of each adjustment.

Referring now to FIG. 1 in particular, it will be observed that a glass jar 10 is shown under inspection in a glassware inspection machine. The jar is shown at an inspection station and is stationary or, its axis may be in a fixed position with the jar being rotated thereabout for optical scanning of a cylindrical lip portion of the jar. Glassware transporting, rotating, and rejecting means form no part of the present invention and have not been shown, but it may be assumed that conventional means in the inspection machine transport jars successively toward the reader to the position shown in FIG. 1, that conventional means rotate the jars at said position or station for optical inspection, and that the jars are thereafter again transported toward the reader and to or past a rejection device operated by the optical inspection apparatus. The direction of transport of the glassware will hereinafter be referred to as "longitudinal" and such terms as "lateral," "vertical," "horizontal," etc., will be used, but only for convenience in description and not in any limiting sense. The machine operator's position and the front of the inspection machine is at the left in FIG. 1.

A light source unit indicated generally at 12 in FIG. 1 directs a beam of light 14 on the jar 10. A focused optical system or apparatus is utilized and the light source unit 12 may include a lense or lenses which collect rays of light emitted from a lamp or the like and focus the same on the jar 10. The lenses and lamp may be disposed within a housing or casing 16 of the light source unit 12 and may be conventional. A light sensitive receiving unit indicated generally at 18 in FIG. 1 picks up light rays 20 reflected from checks or other defects in the illuminated or inspection area 21 on the jar 10. Said receiving unit may comprise conventional collecting and focusing lenses and a shielded photocell or other light sensitive element within a housing 22. Suitable lead wires, not shown, may connect the units 12 and 18 respectively to a source of electrical power and to a rejecting apparatus in the inspection machine.

The aforementioned support means of the present invention comprises, in preferred form, first and second arcuate brackets indicated generally at 24 and 26 respectively. The bracket 24 supports the light source unit 12 and said unit is connected thereto so as to be slidable therealong. The curvature or arc of the bracket is such that the end-to-end arcuate center line lies on the surface of a hypothetical sphere having its center in the illuminated or inspection area 21 on the jar 10. Thus, sliding movement of the light source unit 12 along the bracket effects movement of the unit along the surface of a concentric hypothetical sphere and, more specifically, along a longitudinal line on such sphere as will be seen. Obviously, the angle at which the light beam 14 strikes the jar 10 may be thus changed or adjusted without changing the distances between the inspection area 21 on the jar 10 and the lamp and lenses in the light source unit.

The arcuate bracket 26 supporting the light sensitive receiving unit 18 may be similar to the bracket 24 and is shown as being substantially identical in construction. The said unit 18 is slidable along said bracket 26 and may thus be moved along the surface of the aforementioned concentric hypothetical sphere. More specifically, sliding movement of the unit 18 along the bracket 26 causes the said unit to be moved along a longitudinal line on said sphere. Thus, the angle at which reflected rays 20 are received, or the angle of pick up, may be readily changed without changing the distances between the inspection area 21 on the jar 10 and the photocell and other elements in the receiving unit.

In accordance with the presently preferred practice, the brackets 24 and 26 are T-shaped in cross section and have body portions 28, 28 and oppositely extending arms 30, 30 as best shown in FIGS. 3, 5 and 6. The light source and receiving units 12 and 18 have similar rear portions provided with generally T-shaped slots 32, 32 (FIGS. 5 and 6). As shown, the said T-shaped slots 32, 32 in the light source and receiving units respectively slidably receive the arms 30, 30 and part of the body portions 28, 28 of the brackets 24 and 26 when the said units are mounted on said brackets.

As best shown in FIGS. 5 and 6 wherein the rear portion of the light source unit 12 is illustrated, the arms 30, 30 are loosely received in the slot 32 in said unit. Two adjusting screws 34, 34 engage the outer surface of one arm 30 and a single adjusting screw 36 similarly engages the outer surface of the opposite arm 30. Lock nuts 38, 38 hold the screws 34, 34 in adjusted positions and a lock nut 40 holds the screw 36 in adjusted position. Two biasing devices each comprising a button 42 and an associated biasing spring 44 in a bore 45 act against the inner surface of said one arm 30 to urge the same into engagement with the adjusting screws 34, 34 and a third similar biasing device, not shown, may serve a similar purpose with respect to said opposite arm 30 and the adjusting screw 36. A retaining screw 46 associated with each button 42 prevents said button from falling out of its bore 45 when the adjacent arm 30 is removed from the slot 32.

From the foregoing, it will be apparent that attachment in the nature of a universal connection is effected between the light source and receiving units 12 and 18 and their respective brackets 24 and 26. Suitable adjustments of the screws 34, 34 and the screw 36 on said units can be effected to adjust the position of the units relative to their brackets toward and away from the jar 10 or angularly with respect to said jar. It is to be noted, however, that only a slight or vernier adjustment can be effected with the adjusting screws 34, 34 and 36. Such adjustments may be effected when the inspection apparatus is initially set up for operation to lock the units 12 and 18 in precisely adjusted positions with respect to a jar and with respect to their respective brackets. Thereafter, the positions of units 12 and 18 along their respective brackets may be adjusted as required to change "inspection angles" merely by loosening and then re-tightening the adjusting screws 36, 36.

Returning now to FIG. 1, it will be observed that the bracket 24 has a scale 48 along its body portion 28. A pointer 50 on the aforesaid rear portion of the light source unit 12 cooperates with the scale 48 to indicate adjusted positions of the said unit along the bracket. A similar scale on the bracket 26 cooperates with a pointer on the receiving unit 18 to indicate adjusted positions of the said unit along said bracket. Said two scales and pointers obviously facilitate position adjustments of the units 12 and 18 along their respective brackets and are of particular advantage in repeat setup operations.

At their upper end portions, the brackets 24 and 26 are provided with similar upstanding flanges 52, 52 which have partially circular inner surfaces 54, 54 as best shown in FIG. 3. The said inner surfaces 54, 54 of the flanges 52, 52 engage the peripheral surface 56 of a circular mounting pad 58 which supports the said two brackets. A downwardly extending annular flange 60 formed adjacent said peripheral surface 56 of the pad 58 is slidably entered in annular grooves 62, 62 in said upper end portions of the brackets 24 and 26 and tongues 64, 64 on said upper end portions of the brackets extend radially inwardly adjacent the lower surface of the pad 58. Binder screws 66, 66 entered in the upper end portions of the brackets 24 and 26 urge binder rings 68, 68 into engagement with the upper surface of the pad 58. A flanged clamping nut 70 carried by a bolt 72 extending through a central bore 74 in the pad 58 and through a spacer ring 76 engages the tongues 64, 64 to clamp the same against the lower surface of the mounting pad.

From the foregoing, it will be apparent that the brackets 24 and 26 can be conveniently rotated about the mounting pad 58 and secured in adjusted angular positions relative thereto. On loosening the binder screws 66, 66 and the clamping nut 70, the brackets may be swung about the pad with the aforesaid partially circular surfaces 54, 54 on their flanges 52, 52 in sliding engagement with the peripheral pad surface 56 and with the flanges 60, 60 on the pads sliding in the annular grooves 62, 62 in the brackets. On tightening of the binder screws 66, 66, the binder rings 68, 68 will be urged against the upper surface of the pad 58 to hold the bracket in an adjusted angular position. The clamping nut 70 may also be tightened to firmly engage the tongues 64, 64 and urge the same against the lower surface of said pad.

It will also be apparent from the foregoing that the aforementioned "inspection angles" may be further changed or adjusted by angular adjustments of the brackets 24 and 26 about the mounting pad 58. The said pad and brackets are constructed so that the light source and receiving units 12 and 18 on said brackets are moved along the surface of the aforementioned concentric hypothetical sphere when the brackets are swung about the mounting pad. That is, a center line 59 of the pad 58 may be said to lie along the north-south axis of said concentric hypothetical sphere and the brackets are swung about this axis or center line when they are adjusted around the pad whereby to move the units 12 and 18 thereon along lines of latitude of the said sphere. Obviously, no change in "inspection distances" occurs when the brackets are swung about the pad in such manner. It will now also be obvious that the aforesaid sliding movements of the units 12 and 18 along the brackets 24 and 26 occur along lines of longitude of the concentric hypothetical sphere as stated.

For indicating and recording adjusted angular positions of the brackets 24 and 26 about the pad 58, a scale 78 is provided along the aforementioned peripheral surface 56 of the pad. Pointers, not shown, may be provided on the upper end portions of the brackets 24 and 26, or alternatively, edge portions of the upstanding flanges 52, 52 on said brackets may be utilized as pointers or indicators.

In FIG. 1 it will be observed that the mounting pad 58 is inclined downwardly and forwardly with respect to the longitudinal center line of the inspection machine with its center line and the north-south axis of the aforesaid concentric hypothetical sphere displaced from the vertical. It will also be observed that a similar second mounting pad 80 is supported rearwardly of the longitudinal center line of the machine and similarly inclined downwardly and rearwardly from the said machine center line. It is the presently preferred practice to provide a second mounting pad, such as the pad 80, and to arrange the two pads in inclined relationship as shown. Two or more additional arcuate brackets may be supported by the pad 80 to hold additional light source and receiving units of the optical inspection apparatus. Such additional brackets and light source and receiving units are not shown, but they may be identical in construction and arrangement with the brackets 24 and 26 and the units 12 and 18.

In the preferred embodiment of the invention shown, the aforementioned means which carries the support means comprising the pads 58 and 80 and the parts supported thereby includes a carrier adjustable horizontally in one direction and which is adapted to permit horizontal adjustment of the mounting pads relative thereto in another direction. More specifically, the mounting pads are adjustable horizontally in a longitudinal direction in the inspection machine and the carrier supporting said pads is adjustable horizontally but laterally and forwardly and rearwardly in the machine. As shown, the said carrier comprises front and rear carrier blocks 82 and 106 and front and rear carrier plates 84 and 104. The carrier plates 84 and 104 are fixedly connected with the blocks 82 and 106 and, more specifically, said plates are connected respectively to a forwardly and downwardly inclined surface 86 on the block 84 and to a rearwardly and downwardly inclined surface 87 on the block 106 by means of suitable screws 88, 88. The plates 84 and 104 support the mounting pads 58 and 80 for longitudinal horizontal adjustment as described hereinbelow.

Referring to FIG. 3, it will be observed that the front carrier plate 84 is provided with four longitudinally elongated slots 90, 90 and with a larger and centrally located longitudinally elongated slot 92. Each of the slots 90, 90 has an internal shoulder 94 extending around its side and end walls and engageable with the head of an associated binder screw 96. The screws 96, 96 are entered in suitable threaded openings in the mounting pad 58. A gib 98 is held by retaining screws 100, 100 in the plate 84 and is entered in a longitudinally extending slot and guideway 102 in the mounting pad 58.

From the foregoing it will be apparent that the mounting pad 58 may be moved horizontally and longitudinally with respect to the carrier plate 84 and that the said pad may be secured in adjusted positions relative to said plate. On loosening the binder screws 96, 96, the pad 58 may be moved longitudinally relative to the plate 84 to a selected position. Tightening of the binder screws 96, 96 serves to secure the pad in such position. The rear mounting pad 80 is similarly supported by and similarly adjustable with respect to the rear carrier plate 104. For indicating and recording adjusted positions of the pads 58 and 80, scales 108 and 110 are provided on longitudinally extending edge portions of the carrier plates 84 and 104 respectively. Said scales cooperate respectively with pointers 112 and 114 on the mounting pads 58 and 80.

Horizontal lateral or forward and rearward adjustment of the front and rear carrier blocks 82 and 106 is provided for as mentioned and, as shown, said blocks may be adjusted independently of each other to move the carrier plates 84 and 104, the mounting pads 58 and 80, and the elements supported by said pads forwardly and rearwardly in the machine and toward and away from each other. Each of the carrier blocks 82 and 106 is supported by and is slidable with respect to a carrier mount to be described presently.

As best shown in FIGS. 2 and 4, the said carrier mount comprises two similar plates 116 and 118. The said plates 116 and 118 are secured together in spaced relationship with each other to define a laterally and forwardly and rearwardly extending slot 120 by front and rear connecting brackets 122 and 124 and by an intermediate connecting bracket 126. The front and intermediate connecting brackets 122 and 126 are generally T-shaped and are substantially identical. Said brackets have similar body portions 128 and 130 disposed between and in engagement with the plates 116 and 118 and suitable screws 132, 132 entered in arm portions 134 and 136 thereof connect the brackets to the said plates. The rear connecting bracket 124 has associated connecting screws 138, 138 in an arm portion 140 thereof. The said bracket also has a body portion 142 which is disposed between and in engagement with the plates 116 and 118 and which is similar to but somewhat shorter than the body portions 128 and 130 of the front and intermediate brackets 122 and 126.

The front carrier block 82 is disposed between the front and intermediate connecting brackets 122 and 126 and has slots 144 and 146 in opposite sides thereof which slidably receive edge portions of the plates 116 and 118 adjacent the aforesaid laterally extending slot 120. The rear carrier block 106 is disposed between the intermediate connecting bracket 126 and the rear connecting bracket 124 and has slots 148 and 150 in opposite sides which also slidably receive edge portions of the plates 116 and 118 adjacent the aforesaid laterally extending slot 120. For convenient adjustment of the positions of the carrier blocks 82 and 106 along the slot 120, lower and upper lead screws 152 and 154 are provided. The lower lead screw 152 extends laterally and rearwardly through a suitable bore 156 in the front connecting bracket 122 and into and through a threaded opening 158 in the front carrier block 82. The rear end portion of the lead screw 152 is entered in a suitable bore 160 in the intermediate connecting bracket 126 and is secured against axial movement by means of suitable collars 162 and 164. The upper lead screw 154 extends laterally and rearwardly through a bore 166 in the front connecting bracket 122, a bore 168 in the front carrier block 82, a bore 170 in the intermediate connecting bracket 126, and into a threaded opening 172 in the rear carrier block 106. Suitable collars 174 and 176 engage the intermediate connecting bracket 126 and are secured to the lead screw 154 to prevent axial movement thereof.

From the foregoing, it will be apparent that the lower lead screw 152 may be rotated to adjust the position of the front carrier block 82 forwardly and rearwardly. A binder screw 178 is provided for holding the said block in adjusted position. Similarly, the upper lead screw 154 may be turned to adjust the position of the rear carrier block 106 forwardly and rearwardly. A binder screw 180 associated with said rear block holds the same in adjusted position. As best seen in FIG. 2, a scale 182 is provided on the plate 118 and cooperates with a pointer 184 on the front carrier block 82 and a similar scale 186, also located on the plate 118, cooperates with a pointer 188 on the rear carrier block 106.

Preferably the above-described carrier mount is adjustable vertically and, as best shown in FIGS. 2 and 4, four vertically extending lead screws 190, 190 have their lower ends connected to the plates 116 and 118 to support the same. Set screws 192, 192 prevent rotation of the lead screws 190, 190 relative to suitable threaded openings in the plates 116 and 118 which receive said lead screws. Lock nuts 194, 194 prevent axial movement of the lead screws relative to said plates. At upper end portions thereof the four lead screws 190, 190 are entered respectively in threaded openings 196, 196 in four sprockets 198, 198. The sprockets 198, 198 are journaled in bushings 200, 200 held in bores 202, 202 in an upper frame plate 204 and said sprockets 198, 198 are each engaged with a sprocket chain 206. One of said sprockets 198, 198 has an integrally formed bevel gear 208 which meshes with and is driven by a bevel gear 210 on a stub shaft 212. The shaft 212 is rotatable manually by means of a hand crank 214.

From the foregoing, it will be apparent that the hand crank 214 may be turned to rotate bevel gears 210 and 208 and to drive the sprocket chain 206 whereby to rotate the sprockets 198, 198 in unison. The lead screws 190, 190 may thus be rotated to raise and lower the plates 116 and 118 and the elements supported thereby. Lock nuts 216, 216 adjacent the upper ends of the lead screws 190, 190 may be utilized to secure the said plates and the elements supported thereby in adjusted position. As best seen in FIG. 1, a scale 218 supported by a machine frame member 220 cooperates with a pointer 222 carried by the plate 116 to indicate vertical adjusted positions of the plates 116 and 118 and the elements supported thereby.

The frame member 220 of the inspection machine also supports the aforementioned frame plate 204 and shock absorbers 224, 224 between said member and plate prevent transmittal of machine and other vibrations to the various elements of the mounting means comprising the above-described optical units, support means, carrier, and vertically adjustable carrier mount.

The manner in which the improved mounting means of the present invention is used in operation of the inspection machine is suggested above and need only be summarized here. With a jar representative of a series or run of glass articles at the inspection station, adjustments may be effected to change the positions of the aforementioned support means and the units 12 and 18, or in other words, to adjust the position of the aforementioned hypothetical sphere. That is, the crank handle 214 may be rotated to raise or lower the plates 116 and 118, the lead screws 152 and 154 may be turned to adjust the position of the carrier blocks 82 and 106 forwardly or rearwardly, and the mounting pads 58 and 80 may be adjusted longitudinally on their carrier plates 84 and 104 as required to move the center of the hypothetical sphere to a desired location on the jar. Thereafter, the "inspection angles" may be changed or adjusted as desired by suitable rotation of the arcuate brackets about their mounting pads and by suitable sliding adjustments of the optical units along their respective brackets. Vernier adjustments of the relative positions of said units on their brackets may then be effected if necessary whereupon the machine will be prepared for inspection of the series or run of jars or other articles of glassware. By taking readings from the various scales and recording the same, a repeat setup operation may be effected subsequently in a rapid and convenient manner.

The invention claimed is:

1. In a glassware inspection machine, the combination of optical inspection apparatus comprising at least one light source unit adapted to direct a beam of light on an article of glassware and at least one light sensitive receiving unit adapted to receive rays of light reflected from the illuminated portion of the article of glassware, and support means for holding said light source and light sensitive receiving units in operative positions with respect to an article of glassware, said support means being adapted to provide for adjustment of the position of at least one of said units along at least two arcs on the surface of a hypothetical sphere having its center in the illuminated portion of the article of glassware.

2. The combination set forth in claim 1 wherein said support means is adapted to provide for adjustment of the position of each of the units of said optical inspection apparatus along at least two arcs on the surface of the said hypothetical sphere.

3. In a glassware inspection machine, the combination of optical inspection apparatus comprising at least one light source unit adapted to direct a beam of light on an article of glassware and at least one light sensitive receiving unit adapted to receive rays of light reflected from the illuminated portion of the article of glassware, support means for holding said light source and light sensitive receiving units in operative positions with respect to an article of glassware, said means being adapted to provide for adjustment of the positions of each of said units along at least two arcs on the surface of a hypothetical sphere having its center in the illuminated portion of the article of glassware, and means carrying said support means and adapted to effect adjustment of the position of said support means and the optical units held thereby so as to adjust the position of said hypothetical sphere to accommodate articles of glassware of varying size and shape.

4. In a glassware inspection machine, the combination of optical inspection apparatus comprising at least one light source unit adapted to direct a beam of light on an article of glassware and at least one light sensitive receiving unit adapted to receive rays of light reflected from the illuminated portion of the article of glassware, and support means comprising first and second arcuate supporting brackets on which said light source and receiving units are mounted respectively, said units being slidable along their respective brackets for adjustment of their positions along the surface of a hypothetical sphere having its center in the illuminated portion of the article of glassware, and said brackets each being adjustably supported at one end whereby the positions of the optical units mounted thereon can be further adjusted along the surface of said hypothetical sphere.

5. The combination set forth in claim 4 wherein means is provided for indicating the adjusted positions of said light source and receiving units along their respective brackets and for indicating the adjusted position of each of said brackets.

6. The combination set forth in claim 4 wherein a carrier is provided for said first and second brackets, said carrier being adapted for adjustment of the positions of said brackets with the optical units mounted thereon whereby the position of said hypothetical sphere may be adjusted to accommodate articles of glassware of varying size and shape.

7. In a glassware inspection machine, the combination of optical inspection apparatus comprising at least one light source unit adapted to direct a beam of light on an article of glassware and at least one light sensitive receiving unit adapted to receive rays of light reflected from the illuminated portion of the article of glassware, a mounting pad, and first and second arcuate supporting brackets depending downwardly and outwardly from said pad and adjustable rotatably with respect thereto, said brackets respectively having said light source and receiving units slidably mounted thereon, and said pad and brackets being constructed and arranged so that said light source and receiving units move along longitudinal lines of a hypothetical sphere having its center in the illuminated portion of the article of glassware when the units are adjusted slidably along the brackets and so that said units move along latitudinal lines of said sphere when the brackets are adjusted rotatably with respect to said pad.

8. In a glassware inspection machine, the combination of optical inspection apparatus comprising at least one light source unit adapted to direct a beam of light on an article of glassware and at least one light sensitive receiving unit adapted to receive rays of light reflected from the illuminated portion of the article of glassware, a mounting pad, first and second arcuate supporting brackets depending from said pad and adjustable rotatably with respect thereto, said brackets respectively having said light source and receiving units slidably mounted thereon, and said pad and brackets being constructed and arranged so that said units move along longitudinal lines of a hypothetical sphere having its center in the illuminated portion of the article of glassware when the units are adjusted slidably along the brackets and so that said units move along latitudinal lines of said sphere when the brackets are adjusted rotatably with respect to said pad, a carrier for said mounting pad adapted for horizontal adjustment in one direction and adapted to provide for horizontal adjustment of said pad in another direction, and a vertically adjustable mount for said carrier.

9. The combination set forth in claim 8 wherein scales are provided for indicating the respective positions of said light source and receiving units along their supporting brackets, and wherein additional scales are provided for indicating the horizontal positions of said carrier and pad and for indicating the vertical position of said carrier mount.

References Cited in the file of this patent

UNITED STATES PATENTS

| | | |
|---|---|---|
| 2,208,882 | Graff et al. | July 23, 1940 |
| 2,228,559 | Cox | Jan. 14, 1941 |
| 2,406,166 | Scott | Aug. 20, 1946 |
| 2,550,818 | Johnson | May 1, 1951 |
| 2,675,488 | Bickley | Apr. 13, 1954 |
| 2,773,412 | Huck | Dec. 11, 1956 |
| 2,890,351 | Tongret | June 9, 1959 |
| 2,902,151 | Miles et al. | Sept. 1, 1959 |